(12) United States Patent
Kang et al.

(10) Patent No.: US 9,420,529 B2
(45) Date of Patent: Aug. 16, 2016

(54) METHOD AND APPARATUS FOR REDUCING POWER CONSUMPTION OF BASE STATION IN RADIO COMMUNICATION SYSTEM (71) Applicant: Samsung Electronics Co., Ltd., Suwon-si, Gyeonggi-do (KR)

(72) Inventors: Hyun-Jeong Kang, Seoul (KR); Rakesh Taori, Suwon-si (KR); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 14/061,180

(22) Filed: Oct. 23, 2013

(65) Prior Publication Data

US 2014/0112228 A1    Apr. 24, 2014

(51) Int. Cl.
*H04W 52/02*    (2009.01)

(52) U.S. Cl.
CPC ............ *H04W 52/0206* (2013.01); *Y02B 60/50* (2013.01)

(58) Field of Classification Search
CPC . H04W 52/0206; H04W 52/00; H04W 52/02; H04W 52/04; H04W 52/0235; H04W 52/0254; H04W 52/0274; H04W 52/28; H04W 52/287; H04W 52/44; H04W 72/04; H04W 72/0406; H04W 72/042; H04W 72/0426; H04W 72/1278; H04W 72/1289; H04W 76/00
See application file for complete search history.

(56) References Cited

U.S. PATENT DOCUMENTS

| 4,577,315 | A | 3/1986 | Otsuka | |
|---|---|---|---|---|
| 2009/0003605 | A1 | 1/2009 | Epstein | |
| 2009/0285143 | A1 | 11/2009 | Kwun et al. | |
| 2011/0070881 | A1* | 3/2011 | Hwang et al. | 455/423 |
| 2011/0090829 | A1 | 4/2011 | Wu | |
| 2011/0116476 | A1* | 5/2011 | Lee et al. | 370/331 |
| 2011/0170466 | A1 | 7/2011 | Kwun | |
| 2011/0216683 | A1* | 9/2011 | Ju et al. | 370/311 |
| 2011/0256826 | A1 | 10/2011 | Ode et al. | |
| 2012/0149363 | A1* | 6/2012 | Faerber et al. | 455/423 |

FOREIGN PATENT DOCUMENTS

| KR | 10-2009-0010696 A | 1/2009 |
|---|---|---|
| WO | 2010-086979 A1 | 8/2010 |

* cited by examiner

*Primary Examiner* — Ahmed Elallam
(74) *Attorney, Agent, or Firm* — Jefferson IP Law, LLP (57) ABSTRACT

A method for reducing power consumption of a macro Base Station (BS) in a radio communication system is provided. The method includes transmitting a preamble through at least one mini BS installed within a service coverage area of the macro BS, and transmitting a power-off command to the at least one mini BS after being switched into a power-on state, upon reception of access request information through the at least one mini BS from a terminal that received the preamble.

18 Claims, 9 Drawing Sheets

METHOD AND APPARATUS FOR REDUCING POWER CONSUMPTION OF BASE STATION IN RADIO COMMUNICATION SYSTEM

CROSS-REFERENCE TO RELATED APPLICATION(S)

This application claims the benefit under 35 U.S.C. §119 (a) of a Korean patent application filed on Oct. 23, 2012 in the Korean Intellectual Property Office and assigned Ser. No. 10-2012-0117594, the entire disclosure of which is hereby incorporated by reference.

TECHNICAL FIELD

The present disclosure relates to an apparatus and a method for reducing power consumption of a base station in a radio communication system.

BACKGROUND

It is considered that the next generation radio communication system uses high frequency waves, such as millimeter Waves (mmW), for supporting mass data services. In the system that uses the high frequency band, a distance between a subscriber station (or a terminal) and a base station is decreased, which in turn reduces the cell radius of the base station, thus increasing the number of base stations to be installed to secure a service coverage for terminals. The increase in the number of base stations leads to an increase in overall power consumption of the system.

Therefore, a need exists for a method for reducing power consumption increased due to an increase in number of base stations in a radio communication system that uses a high frequency band.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for reducing power consumption of a base station in a radio communication system.

In accordance with an aspect of the present disclosure, a method for reducing power consumption of a macro Base Station (BS) in a radio communication system is provided. The method includes transmitting a preamble through at least one mini BS installed within a service coverage area of the macro BS, and transmitting a power-off command to the at least one mini BS after being switched into a power-on state, upon reception of access request information through the at least one mini BS from a terminal that received the preamble.

In accordance with another aspect of the present disclosure, a method for reducing power consumption of a macro BS in a radio communication system is provided. The method includes transmitting a preamble upon reception of a power-on command from the macro BS, forwarding access request information received from a terminal that received the preamble to the macro BS, and stopping the transmitting of the preamble upon reception of a command to stop the transmitting of the preamble from the macro BS.

In accordance with another aspect of the present disclosure, a method for reducing power consumption of a macro BS by a terminal in a radio communication system is provided. The method includes receiving a preamble that includes indication information and determining an entity that transmits the preamble based on the indication information, and transmitting access request information to the macro BS, if the entity is not the macro BS, and performing an access procedure with the macro BS upon expiration of an access waiting time.

In accordance with another aspect of the present disclosure, a macro BS for reducing power consumption in a radio communication system is provided. The macro BS includes a transceiver configured to transmit a preamble through at least one mini BS installed within a service coverage area of the macro BS, and a controller configured to control the transceiver to transmit a power-off command to the at least one mini BS, after being switched into a power-on state upon recognition that access request information of a terminal that received the preamble has been received through the at least one mini BS.

In accordance with another aspect of the present disclosure, a mini BS for reducing power consumption of a macro BS in a radio communication system is provided. The mini BS includes a transceiver configured to recognize that a power-on command has been received from the macro BS, and a controller configured to control the transceiver to transmit a preamble, control the transceiver to forward the macro BS access request information received from a terminal that received the preamble, and control the transceiver to stop transmitting the preamble upon recognition that a command to stop the transmitting of the preamble has been received through the transceiver.

In accordance with another aspect of the present disclosure, a terminal for reducing power consumption of a macro BS by a terminal in a radio communication system is provided. The terminal includes a transceiver configured to receive a preamble that includes indication information, and a controller configured to determine an entity that transmits the preamble based on the indication information, control the transceiver to transmit access request information to the macro BS, if the entity is not the macro BS, and perform an access procedure with the macro BS upon expiration of an access waiting time.

Other aspects, advantages, and salient features of the present disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It will be understood that, although the terms first, second, third, and the like, may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosure. Descriptions shall be understood as to include any and all combinations of one or more of the associated listed items when the items are described by using the conjunctive term "~ and/or ~," or the like.

The terminology used herein is for the purpose of describing particular embodiments only and is not intended to be limiting of the disclosure. It is to be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In various embodiments of the present disclosure, a method for reducing power consumption of a Base Station (BS) in a radio communication system is provided. The method includes installing mini data processing Device Units (hereinafter, referred to as 'mini DUs' or 'mini BSs'), detecting whether there is any terminal operating in an active mode within a service coverage area of the BS that serves a corresponding cell, and controlling power of the BS based on the detection. More specifically, if there is no terminal operating in an active mode within the service coverage area of the BS, the BS drives mini DUs installed within the service coverage area to forward a preamble signal and UpLink (UL) access information to terminals on behalf of the BS, turns off its communication module for communication with terminals, and is switched into (or transitions to) a power-off state. Upon detection of a terminal that requests access to the BS, the BS is switched back into a power-on state while turning off the mini DUs and performs an access procedure with the terminal. The mini DU may be a mini cell base station, such as a pico BS or femto BS installed in a pico cell or femto cell, which has a relatively narrow service coverage area compared with a macro BS, or also may be a Remote Radio Head (RRH) that has relaying functionality, i.e., an antenna functionality.

Figure 1A:
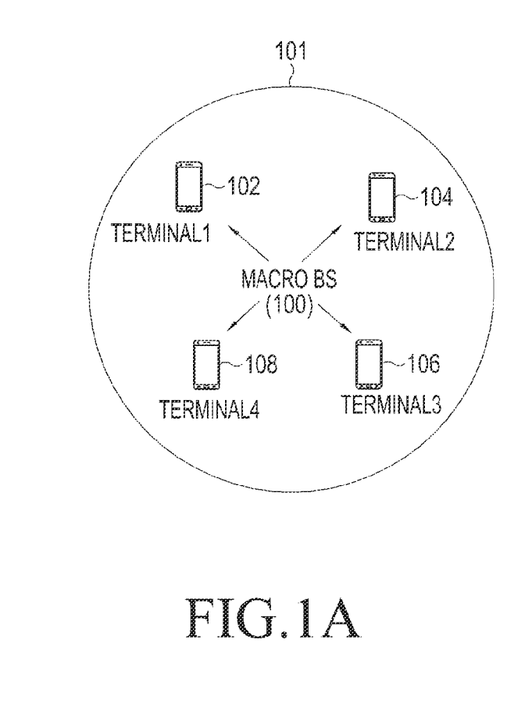
FIGS. 1A, 1B, and 1C are schematic diagrams illustrating a radio communication system according to an embodiment of the present disclosure.
Figure 1B:
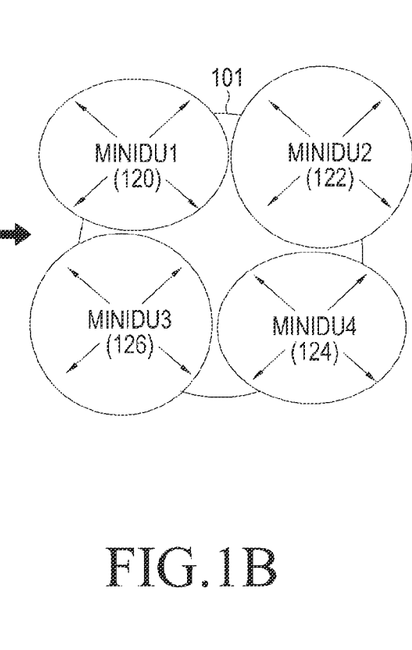
Figure 1C:
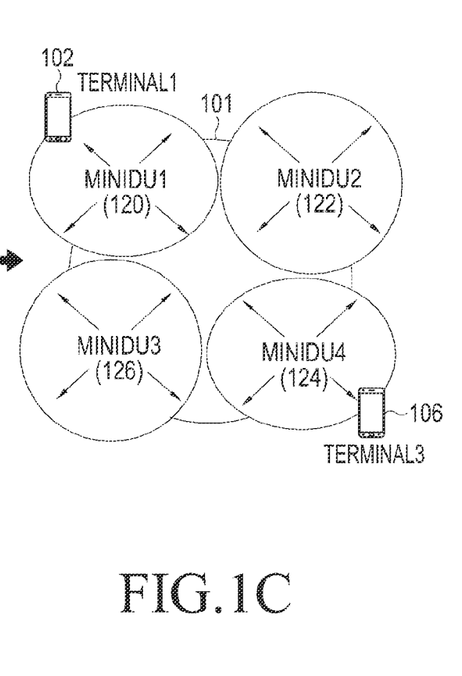

FIGS. 1A, 1B, and 1C are schematic diagrams illustrating a radio communication system according to an embodiment of the present disclosure.

Referring to FIG. 1A, the radio communication system includes a macro BS 100, and terminals 1, 2, 3, and 4 (102, 104, 106, and 108, respectively) which are located within a service coverage area 101 of the macro BS 100. The terminals 1 to 4 (102 to 108, respectively) receive data services through the macro BS 100.

Referring to FIG. 1B, the radio communication system 101 includes e.g., four mini DUs, mini DU1, mini DU2, mini DU3, and mini DU4 (120, 122, 124 and 126, respectively). The mini DU1 to mini DU4 (120, 122, 124, and 126, respectively) are distributed across the service coverage area 101 and cover the service coverage area 101 for the macro BS 100 while the macro BS 100 is powered off.

The conditions under which the macro BS 100 may be switched into a power-off mode are when:
there is no DownLink (DL) data left in a DL data buffer,
there is no UL data received from the terminal 1 to 4 (102, 104, 106, and 108, respectively),
there is no active transaction because all of the serviced terminals 1 to 4 (102, 104, 106, and 108, respectively) are operating in an idle mode, or
an indication that there is no terminal operating in an active mode is received from a high-level entity server. In the following description, a case where there is no active terminals within the service coverage area typifies such conditions under which the macro BS 100 is switched into a power-off mode.

When the macro BS 100 is switched into the power-off state, the mini DU1 to mini DU4 (120, 122, 124, and 126, respectively) transmit reference signals, i.e., preambles and provide UL access resources to terminals located within the service coverage area 101 of the macro BS 100 in the place of the macro BS 100.

Accordingly, in the embodiment of the present disclosure, even while the macro BS 100 is in a power-off mode, mini DUs installed within the service coverage area 101 of the macro BS 100 and operating as described above may enable an access request from the terminal to be fulfilled.

Referring to FIG. 1C, as an example, upon recognition of terminal 1 (102) and terminal 3 (106) within the service coverage area 101 of the macro BS 100, which are located adjacent to mini DU 1 (120) and mini DU 3 (124), respectively, i.e., upon recognition of terminal 1 (102) and terminal 3 (106) transmitting access request information with the UL access resources, the macro BS 100 that has thus far been powered off is switched into a power-on state. In the power-on state, the macro BS 100 serves the service coverage area 101 instead of mini DU1 to mini DU4 (120, 122, 124, and 126, respectively).

In various embodiments of the present disclosure, the number of mini DUs installed within the service coverage area of a macro BS may be determined by comparing power consumption of the macro BS saved due to operations of the mini DUs with total power consumption of the mini DUs. More specifically, such a number of mini DUs that may satisfy a condition that total power consumption of the mini DUs is not greater than the saved power consumption of the BS may be installed within the service coverage area of the macro BS. In the comparison, a path loss that depends on a gap between the macro BS and the min DUs may also be taken into account.

In some embodiments of the present disclosure, mini DUs installed within the service coverage area of the macro BS may operate not only with the macro BS but also with a pico BS or femto BS installed in a pico cell or femto cell, or a Cloud-Radio Access Network (C-RAN) type BS, which has a narrower service coverage area than the service coverage area of the macro BS.

Figure 2:
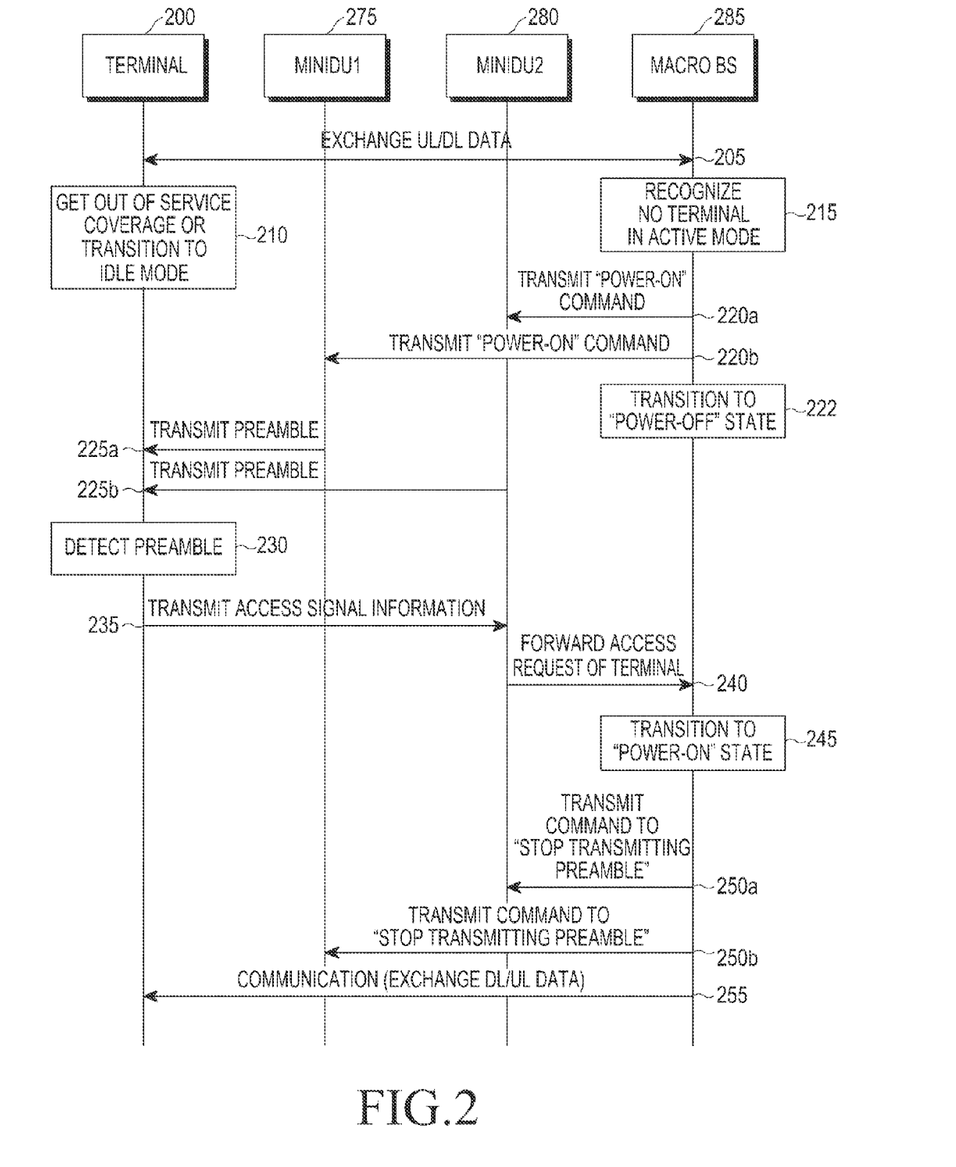
FIG. 2 is a signaling chart illustrating a method for reducing power consumption of a Base Station (BS) in a radio communication system according to an embodiment of the present disclosure.

FIG. 2 is a signaling chart illustrating a method for reducing power consumption of a BS in a radio communication system according to an embodiment of the present disclosure. In the following description, it is assumed that the radio communication system has two mini DUs, e.g., mini DU1 (275) and mini DU2 (280) installed within the service coverage area of a macro BS 285.

Referring to FIG. 2, in operation 205, a terminal 200 exchanges UL and DL data with the macro BS 285. It is assumed that in operation 210, the terminal 200 is out of the service coverage area of the macro BS 285 or enters an idle mode, thus stopping an active communication with the macro BS 285. Being out of the service coverage area of the macro BS 285 occurs when the terminal 200 moves into any other service coverage area of any other BS or when the terminal 200 terminates a service from the macro BS 285. In operation 215, the macro BS 285 recognizes that there is no terminal to serve, i.e., there is no terminal operating in an active mode, within the service coverage area of the macro BS 285. In operations 220a and 220b, the macro BS 285 sends the mini DU2 280 and the mini DU1 275 "power-on" commands to turn them on, respectively, the macro BS 285 being already aware that the mini DU1 275 and mini DU2 280 are installed within its service coverage area. In operations 225a and 225b, the mini DU1 275 and mini DU2 280 broadcast a preamble, respectively. At this time, each of the mini DU1 275 and mini DU2 280 may also transmit information regarding UL access resources for a terminal, e.g., the terminal 200, which is located within the service coverage area of the macro BS 285.

Although not shown in FIG. 2, upon reception of an ACKnowledgment (ACK) message from each of the mini DUS that receive the power-on command from the macro BS 285, i.e., the mini DU1 275 and mini DU2 280, in operation 222, the macro BS 285 is switched into the power-off state by disabling its communication module for communication with the terminal 200.

In operation 230, assume that the terminal 200 moves into the service coverage area of the macro BS 285 or is switched from the idle mode to the active mode, and receives at least one of preambles transmitted from the mini DU1 275 and mini DU2 280. In operation 235, the terminal 200 transmits access request information to request access to a BS that transmitted the preamble. Here, assume that the terminal 200 may transmit the access request information to the mini DU2 280. UL resources to be used for the terminal 200 to transmit the access request information are obtained based on the information regarding UL access resources obtained in operation 225b.

In operation 240, the mini DU2 280 forwards the access request information received from the terminal 200 to the macro BS 285.

The access request information may include, but not limited to, an access request signal and associated power, time and frequency information or adjustments thereof. In operation 245, the macro BS 285 is switched into the power-on state by turning on its communication module for communication with the terminal 200. In operations 250a and 250b, the macro BS 285 transmits a command to "stop transmitting preamble" to the mini DU2 280 and the mini DU1 275, respectively. Although not shown in FIG. 2, the mini DU1 275 and mini DU2 280 that receive the command to "stop transmitting the preamble" each stop transmitting the preamble to the terminal 200 and are switched into the power-off state. Thereafter, although not shown in FIG. 2, the macro BS 285 determines that the mini DU1 275 and mini DU2 280 have been switched into a standby mode, by receiving ACK signals from the mini DU1 275 and mini DU2 280 in return for the command to "stop transmitting preamble". The standby mode represents a state in which the mini DU is driven at minimum power to receive the "power-on" command from the macro BS. In operation 255, the macro BS 285 serves the terminal 200 by exchanging DL/UL data with the terminal 200.

Figure 3:
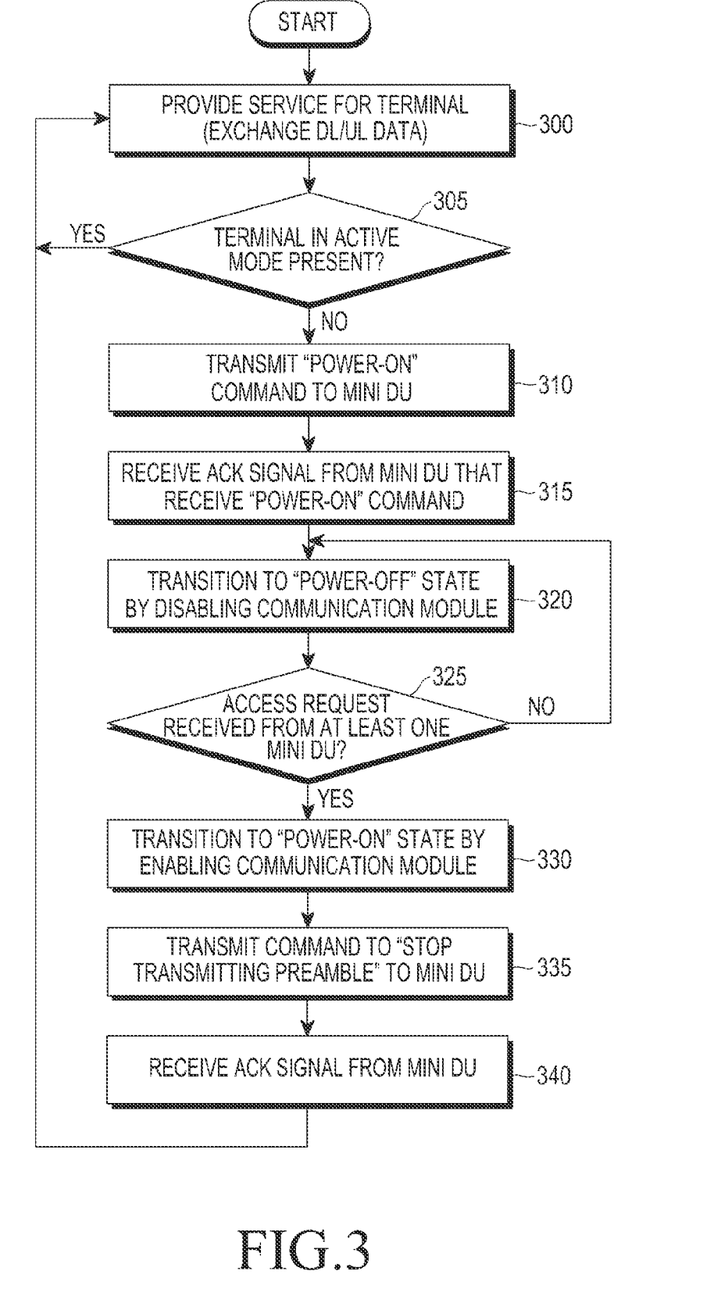
FIG. 3 is a flowchart illustrating operations of a macro BS in a radio communication system according to an embodiment of the present disclosure.

FIG. 3 is a flowchart illustrating operations of a macro BS in a radio communication system according to an embodiment of the present disclosure.

Referring to FIG. 3, in operation 300, the macro BS serves a terminal by exchanging DL/UL data with the terminal. In operation 305, the macro BS determines whether there is any terminal operating in an active mode within a service coverage area of the macro BS. If there is a terminal operating in an active mode, the macro BS remains in the power-on state to serve the terminal.

Otherwise, if there is no terminal operating in an active mode, in operation 310, the macro BS transmits the "power-on" command to instruct each of mini DUs managed by the macro BS to broadcast a preamble.

In operation 315, upon reception of ACK signals from all the mini DUs that receive the "power-on" command, in operation 320, the macro BS is switched into the power-off state by disabling its communication module for communication with the terminal. In operation 325, the macro BS determines if an access request from a terminal is received from at least one of the mini DUs. If no access request from a terminal was received, the macro BS returns to operation 320 to remain in the power-off state. Otherwise, if an access request from a terminal is received from at least one of the mini DUs, in operation 330, the macro BS is switched into the power-on state by enabling its communication module for communication with the terminal. In operation 335, the macro BS transmits the command to "stop transmitting preamble" to the mini DUs. In operation 340, the macro BS determines that all of the mini DUs are in a standby mode by receiving ACK signals in return for the command to "stop transmitting preamble" from the mini DUs. The macro BS returns to operation 300 to serve the terminal.

Figure 4:
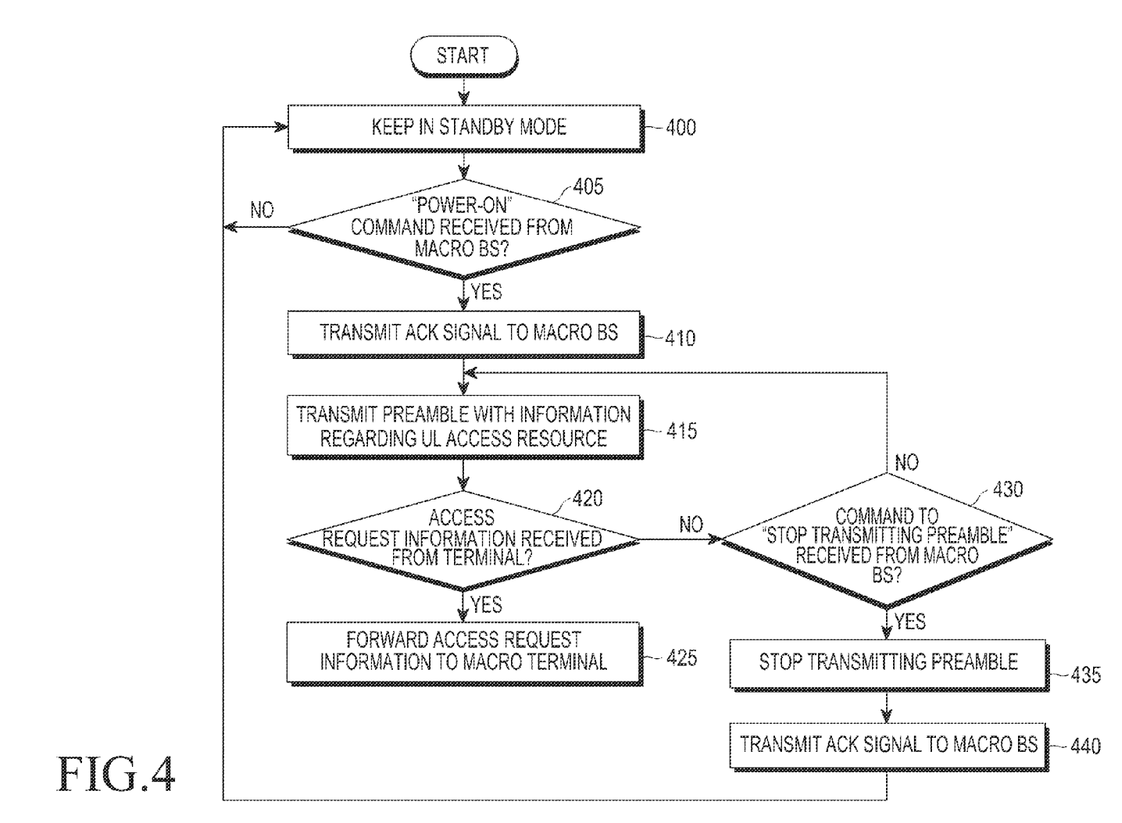
FIG. 4 is a flowchart illustrating operations of a mini Device Unit (DU) installed within a service coverage area of a macro BS in a radio communication system according to an embodiment of the present disclosure.

FIG. 4 is a flowchart illustrating operations of a mini DU installed within a service coverage area of a macro BS in a radio communication system according to an embodiment of the present disclosure.

Referring to FIG. 4, in operation 400, the mini DU remains in a standby mode.

In operation 405, the mini DU determines if the "power-on" command is received from the macro BS. If the "power-on" command is not received, the mini DU returns to operation 400 to remain in a standby mode.

If the "power-on" command is received from the macro BS, in operation 410, the mini DU transmits an ACK signal to the macro BS in response to the "power-on" command. In operation 415, the mini DU starts transmitting a preamble. At this time, the mini DU also starts transmitting information regarding UL access resources assigned by the macro BS.

In operation 420, the mini DU determines whether access request information has been received from the macro BS. If the access request information has been received, in operation 425, the mini DU forwards the access request information to the macro BS.

Otherwise, if the access request information has not been received, in operation 430, the mini DU determines whether a command to "stop transmitting preamble" has been received from the macro BS. If the command to "stop transmitting preamble" has not been received from the macro BS, the mini DU returns to operation 415 to continue to transmit the preamble.

Otherwise, if the command to "stop transmitting preamble" has been received from the macro BS, in operation 435, the mini DU stops transmitting the preamble. In operation 440, the mini DU transmits an ACK signal to the macro BS in response to the command to "stop transmitting preamble", and returns to operation 400 to enter a standby mode.

In other embodiments of the present disclosure, a method for reducing power consumption of a macro BS by taking into account a case where a terminal is aware of a switched state of a power mode of the macro BS is provided. The switched state of a power mode of the macro BS corresponds to a switched state of the macro BS switching from "power on" to "power off" or a switched state of the macro BS switching from "power off" to "power on". More specifically, if a terminal is aware of a switched state of a power mode of the macro BS, it prevents a situation where handling of the access request of the terminal is delayed due to the time needed for the macro BS to be switched from the "power-off" state to the "power-on" state or a situation where the terminal unnecessarily repeats the access request. Accordingly, in various embodiments of the present disclosure, in order for a terminal to be aware of the switched state of a power mode of the macro BS, indication information is provided to the terminal that distinguishes whether a cell in which the terminal made the access request is being served by the macro BS or by the mini DU. For example, the indication information may be configured to indicate whether an entity that transmitted the preamble is a BS. Alternatively, the indication information may be configured in the form of an IDentification (ID) to distinguish whether the entity is a macro BS or a mini DU.

More specifically, in various embodiments of the present disclosure, when a mini DU transmits a preamble in the place of the macro BS that is switched into the "power-off" state, the mini DU transmits information in the preamble, the information indicating that an entity transmitting the preamble is the mini DU. For example, the preamble includes the indication information indicating whether an entity transmitting the preamble is the macro BS or the mini DU and ID information regarding the ID of the entity indicated by the indication information.

In other embodiments of the present disclosure, the mini DU may also transmit the preamble with information regarding UL access resources, the information regarding UL access resources containing indication information indicating the entity that transmits the preamble and information regarding UL access resources. Similarly, in yet other embodiments of the present disclosure, where the macro BS that is in the "power-on" state transmits a preamble, indication information indicating that an entity transmitting the preamble is the macro BS itself is included in the preamble. The macro BS may also transmit the preamble with one of ID information of the entity indicated by the indication information and information regarding UL access resources to be transmitted with the preamble.

A terminal that receives the indication information may determine from the indication information whether an entity transmitting the preamble and UL access resources is the macro BS or the mini DU. If it is determined that the entity is the mini DU, the terminal may be aware that the macro BS is in the power-off state. Thereafter, the terminal transmits an access request signal to the macro BS based on the received information regarding UL access resource, and waits for a response to the access request for a waiting time A. The waiting time A corresponds to the time it takes the target macro BS of the access request of the terminal to be switched from the "power-off" state to the "power-on" state. Upon expiration of the waiting time A, the terminal transmits an access preamble to the macro BS switched into the power-on state and performs communication with the macro BS.

Figure 5:
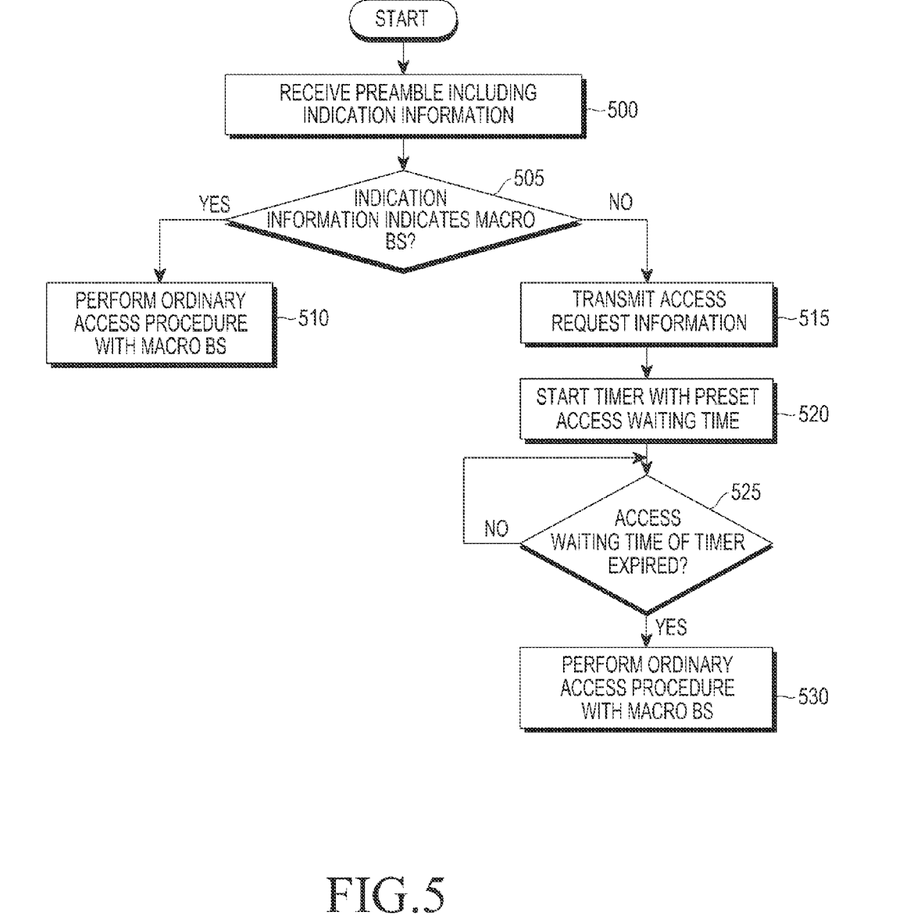
FIG. 5 is a flowchart illustrating operations of a terminal based on whether the terminal is aware of a switched state of a power mode of a macro BS according to an embodiment of the present disclosure.
Figure 6:
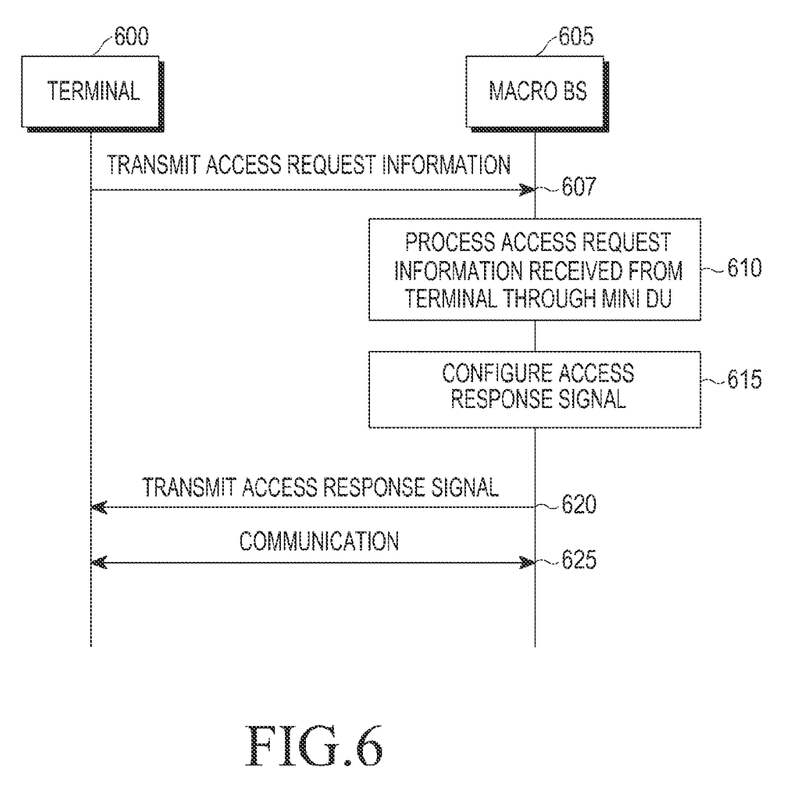
FIG. 6 is a signaling chart illustrating operations of an access procedure between a macro BS and a terminal that is not aware of a switched state of a power mode of the macro BS in a radio communication system according to an embodiment of the present disclosure.
Figure 7:
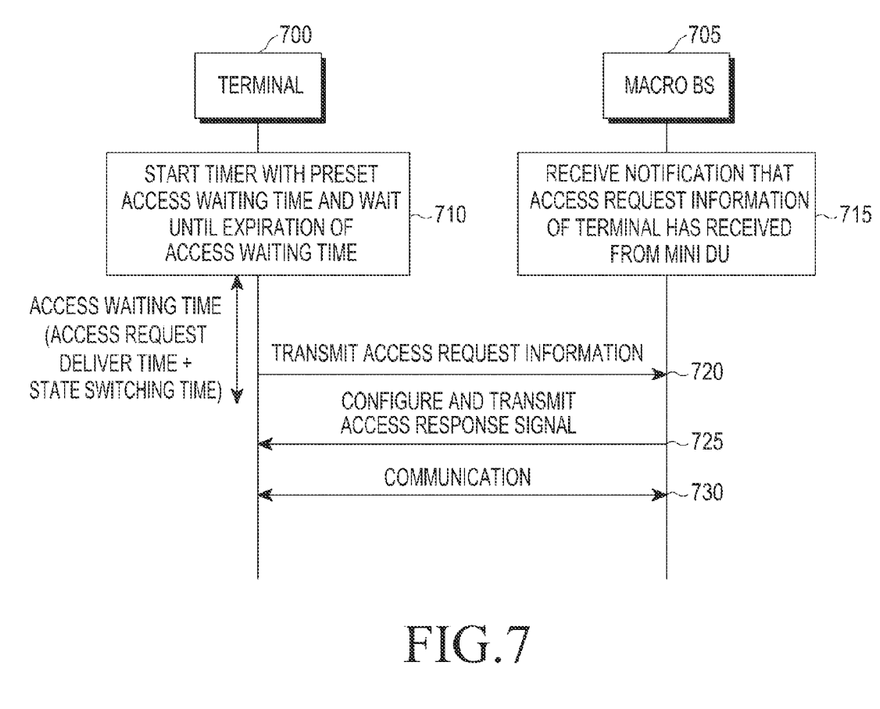
FIG. 7 is a signaling chart illustrating operations of an access procedure between a macro BS and a terminal that is aware of a switched state of a power mode of the macro BS in a radio communication system according to an embodiment of the present disclosure.

Referring to FIGS. 5 to 7, operations of a terminal based on whether the terminal is aware of a switched state of a power mode of a macro BS will be described below.

FIG. 5 is a flowchart illustrating operations of a terminal based on whether the terminal is aware of a switched state of a power mode of a macro BS according to an embodiment of the present disclosure.

Referring to FIG. 5, in operation 500, the terminal receives a preamble. The preamble includes indication information indicating whether an entity transmitting the preamble is a macro BS or a mini DU installed within a service coverage area of the macro BS, and ID information of the entity indicated by the indication information. In operation 505, the terminal determines from the indication information whether the entity transmitting the preamble is the macro BS or the mini DU installed within the service coverage area of the macro BS. If it is determined that the entity transmitting the preamble is the macro BS, in operation 510, the terminal performs an ordinary access procedure with the macro BS. The ordinary access procedure includes the terminal transmitting access request information to the macro BS and receiving an access response from the macro BS.

Otherwise, if it is determined from the indication information that the entity transmitting the preamble is the mini DU, the terminal proceeds to operation 515. In operation 515, the terminal transmits access request information based on information regarding UL access resources received together with the preamble. In operation 520, the terminal starts a timer with an access waiting time. In operation 525, the terminal determines whether the access waiting time of the timer has expired. If it is determined that the access waiting time has not yet expired, the terminal waits until the expiration of the access waiting time.

Otherwise, upon expiration of the access waiting time of the timer, in operation 530, the terminal is aware that the macro BS was switched from the "power-off" state to the "power-on" state, and performs an access procedure with the macro BS. The access procedure begins with the terminal transmitting the access preamble to the macro BS.

FIG. 6 is a signaling chart illustrating operations of an access procedure between a macro BS and a terminal that is not aware of a switched state of a power mode of the macro BS in a radio communication system according to an embodiment of the present disclosure. The access procedure herein corresponds to the ordinary access procedure between the terminal and the macro BS, as described in operation 510 of FIG. 5.

Referring to FIG. 6, in operation 607, a macro BS 605 processes access request information received from a terminal 600 via a mini DU. The access request information may include, but not limited to, an access request signal and associated power, time and frequency information or adjustments of the associated power, time and frequency. In operation 610, the macro BS 605 processes access request information received from the terminal 600, and in operation 615, the macro BS 605 configures an access response signal to be transmitted to the terminal 600. In operation 620, the macro BS 605 transmits the access response signal to the terminal 600. In operation 625, the terminal 600 and the macro BS 605 performs a post-access communication procedure, i.e., exchanges DL and UL signals.

FIG. 7 is a signaling chart illustrating operations of an access procedure between a macro BS and a terminal that is aware of a switched state of a power mode of the macro BS in a radio communication system according to an embodiment of the present disclosure. The access procedure corresponds to operations 515 to 530 that the terminal not aware of the switched state of a power mode of the macro BS performs with the macro BS.

Referring to FIG. 7, in operation 710, a terminal 700 starts a timer with an access waiting time after transmitting access request information, and waits until the expiration of the access waiting time of the timer. In some embodiments of the present disclosure, the access waiting time includes the time it takes a mini DU to receive the access request information and send a macro BS 705 notification that the access request information has been received, which is called 'access request delivery time' and the time it takes the macro BS 705 to be switched from the "power-off" state to the "power-on" state, which is called 'state switching time'. The access waiting time may be set to be less than the time it takes the terminal 700 to transmit the access request information directly to the macro BS 705 and wait for an access response from the macro BS 705.

On the other hand, in operation 715, the macro BS 705 receives from the mini DU among mini DUs installed within the service coverage area of the macro BS 705 the notification that the terminal 700 has received the access request information, and is switched from the power-off" state to the "power-on" state to start communication with the terminal 700.

Upon expiration of the access waiting time, in operation 720, the terminal 700 transmits access request information to the macro BS switched into the power-on mode. In operation 725, the macro BS 705 configures an access response signal based on the access request information and transmits the access response signal to the terminal 700. In operation 730, the terminal 700 and the macro BS 705 perform a post-access communication procedure.

In various embodiments of the present disclosure, a mini DU installed within a service coverage area of a macro BS configures and transmits a preamble and information regarding UL access resources in the place of the macro BS, after the macro BS is switched into a power-off mode. Thereafter, a terminal may determine from the preamble or the information regarding UL access resources whether an entity transmitting the preamble is the macro BS or the mini DU. If it is determined that the entity is the mini DU, the terminal waits for an access waiting time and transmits an access request to the macro BS.

In some embodiments of the present disclosure, where mini DUs may not configure a preamble and information regarding UL access resources but relay a signal received from the macro BS or the terminal, a method for reducing power consumption of the macro BS is suggested. More specifically, the macro BS transmits a preamble and information regarding UL access resources in the power-off state. The mini DUs managed by the macro BS may receive the preamble and the information regarding UL access resources and relay them to the terminal. In various embodiments of the present disclosure, assume that the mini DUs may not configure and transmit a signal by themselves but relay signals received from terminals or the macro BS.

Figure 8:
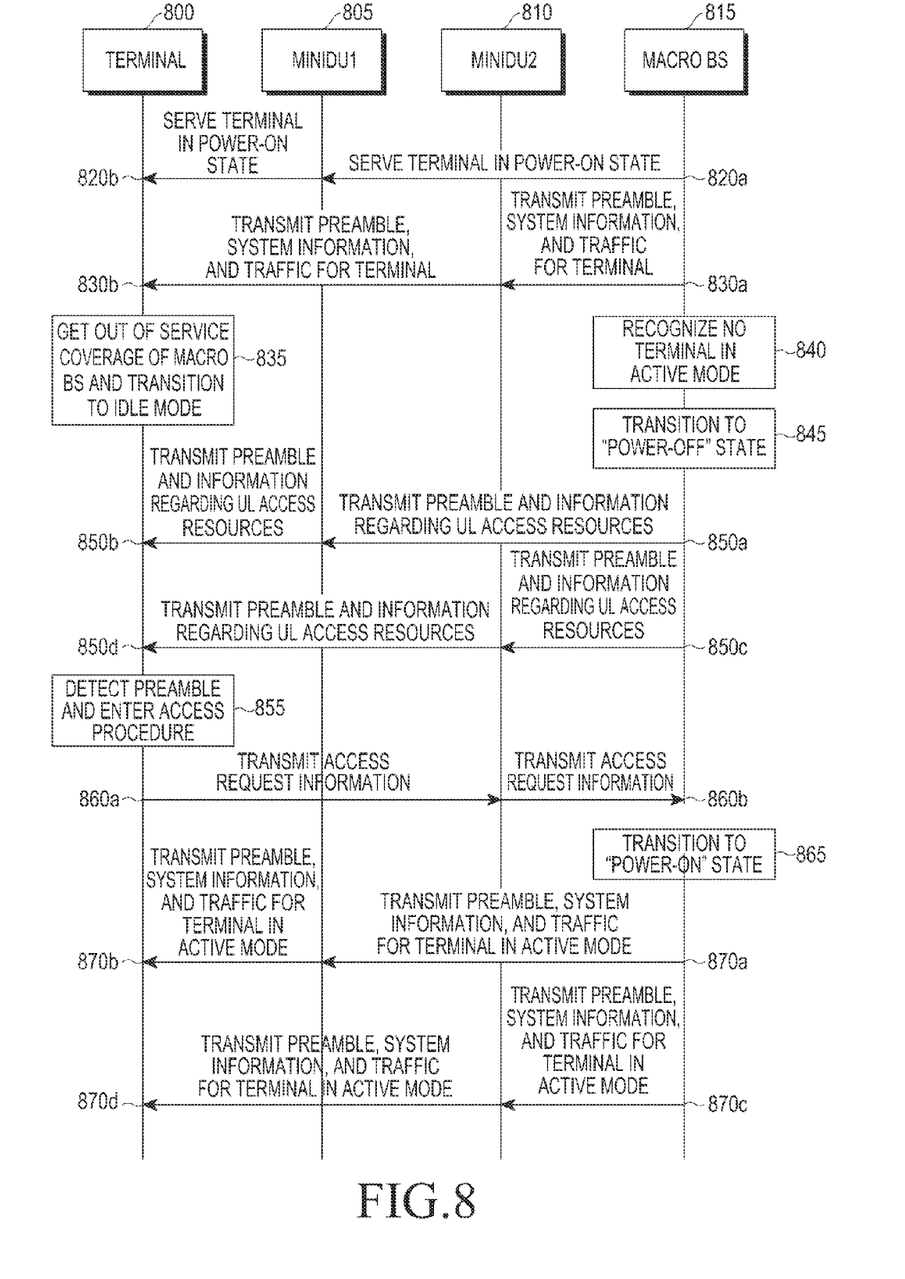
FIG. 8 is a signaling chart illustrating a method for reducing power consumption of a BS in a radio communication system according to an embodiment of the present disclosure.

FIG. 8 is a signaling chart illustrating a method for reducing power consumption of a BS in a radio communication system according to an embodiment of the present disclosure.

Referring to FIG. 8, in operations 820a and 820b, a macro BS 815 performs operations to serve a terminal 800 via a mini DU1 805. In operations 830a and 830b, the macro BS 815 transmits a preamble, system information, and traffic for the terminal 800, an example of a terminal that operates in an active mode to the mini DU1 805 and mini DU2 810, respectively. Although not shown in FIG. 8, there may be a large number of terminals operating in an active mode within a respective service coverage area of the mini DU1 805 and the mini DU2 810, including the terminal 800.

In operations 830a and 830b, the mini DU1 805 and mini DU2 810 forward the terminal 800 the preamble, system information and the traffic for the terminal 800 received from the macro BS 815, respectively.

In operation 835, assume that the terminal 800 moves out of the service coverage area of the macro BS 815. In operation 840, the macro BS 815 recognizes that there is no terminal operating in an active mode within its service coverage area.

In operation 845, the macro BS 815 is switched into the power-off state by disabling its communication module for communication with the terminal 800. In this embodiment of the present disclosure, the macro BS 815 transmits the preamble and information regarding UL access resources in the power-off state. Thereafter, mini DUs installed within the service coverage area of the macro BS 815, e.g., the mini DU1 805 and the mini DU2 810, each forward signals received from the macro BS 815 to the terminal 800. More specifically, in operations 850a and 850c, the macro BS 815 transmits the preamble and information regarding UL access resources to the mini DU1 805 and mini DU2 810, respectively. Upon reception of the preamble and the information regarding UL access resources from the macro BS 815, in operations 850b and 850d, the mini DU1 805 and mini DU2 810 forward the preamble and the information regarding UL access resources to the terminal 800, respectively.

In operation 855, upon detection of the preamble received from the macro BS 815 through the mini DU1 805 and mini DU2 810, the terminal 800 starts an access procedure with the macro BS 815. In operation 860a, the terminal 800 transmits access request information to the mini DU2 810, which is destined for the macro BS 815. In operation 860b, upon reception of the access request information, the mini DU2 810 forwards the access request information to the macro BS 815. In operation 865, upon reception of the access request information, the macro BS 815 is switched into the "power-on" state.

In operations 870a and 870c, the macro BS 815 switched into the power-on state transmits a preamble, system information, and traffic for terminals that operates in an active mode, including the terminal 800 to the mini DU1 805 and the mini DU2 810, respectively. In operations 870b and 870d, the mini DU1 805 and the mini DU2 810 forward the preamble, system information, and traffic for terminals operating in an active mode to the terminals operating in an active mode, including the terminal 800, respectively.

Figure 9:
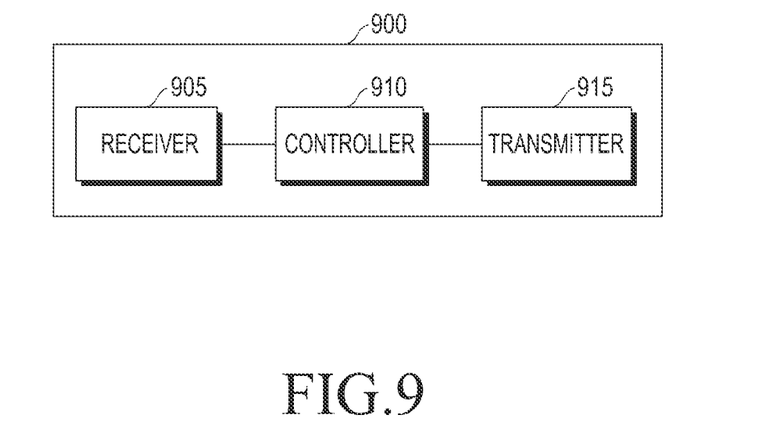
FIG. 9 is a schematic block diagram illustrating an apparatus for reducing power consumption of a BS in a radio communication system according to an embodiment of the present disclosure.

FIG. 9 is a schematic block diagram illustrating an apparatus for reducing power consumption of a BS in a radio communication system according to an embodiment of the present disclosure.

Referring to FIG. 9, an apparatus 900 includes a receiver 905, a controller 910, and a transmitter 915. The apparatus 900 may act as a terminal, a mini DU, or a macro BS. For convenience of explanation, the receiver 905 and the transmitter 915 are shown as a single pair. However, in practical implementations, the receiver 905 and the transmitter 915 may be divided into a first transceiver for transmitting and receiving signals between a macro BS and a mini DU and a second transceiver for transmitting and receiving signals between the macro BS/mini DU and the terminal.

First, an embodiment where the apparatus 900 acts as a terminal will be described. As discussed above, the apparatus 900 is determined to act as a terminal based on whether the apparatus 900 is aware of a switched state of a power mode of a BS.

In this case, the apparatus 900 receives a preamble that includes indication information. The indication information indicates whether an entity transmitting the preamble is a macro BS or a mini DU. If the indication information indicates that the entity is a macro BS, the controller 910 controls an ordinary access procedure to be performed with the macro BS.

If the indication information indicates that the entity is a mini DU, the controller 910 controls the transmitter 915 to transmit access request information to the mini DU, which is destined for the macro BS. The controller 910 starts a timer with an access waiting time. The access waiting time includes the time it takes the mini DU to receive the access request information and send the macro BS notification that the access request information has been received, which is called 'access request delivery time', and the time it takes the macro BS to be switched from the "power-off" state to the "power-on" state, which is called 'state switching time'. The access waiting time is set to be less than the time it takes the terminal, the apparatus 900, to transmit the access request information directly to the macro BS without sending to the mini DU and wait for an access response from the macro BS.

Upon expiration of the access waiting time of the timer, the controller 910 performs an access procedure with the macro BS.

An embodiment where the apparatus 900 acts as a macro BS will now be described.

The controller 910 determines whether there is any terminal operating in an active mode within the service coverage area of the apparatus 900 as the macro BS.

If there is no terminal operating in an active mode, the controller 910 controls the transmitter 915 to transmit a "power-on" command to mini DUs that the apparatus 900 manages. If the receiver 905 receives an ACK signal from at least one mini DUs in return for the "power-on" command, the controller 910 is switched into the "power-off" state. Thereafter, upon recognition that the receiver 905 has received the access request information of the terminal from at least one mini DU, the controller 910 is switched into the "power-on" state. The controller 910 controls the transmitter 915 to transmit a command to "stop transmitting preamble" to the mini DUs. In return, upon reception of ACK signals from the mini DUs through the receiver 905, the controller 910 recognizes that the mini DUs have been switched into a standby mode. In the standby mode, the mini DUs are driven at minimum power to receive the "power-on" command from the macro BS without performing transmit operations.

The controller 910 serves the terminal that transmitted the access request information by performing the access procedure with the terminal.

An embodiment where the apparatus 900 acts as a mini DU will be described.

In this embodiment of the present disclosure, upon recognition that the receiver 905 has received the "power-on" command from the macro BS, the controller 910 is switched into the power-on mode and controls the transmitter 915 to transmit an ACK signal to the macro BS in response to the "power-on" command. The controller 910 controls the transmitter 915 to transmit a preamble together with information regarding UL access resources to terminals located within the service coverage area of the apparatus 900. Upon reception of access request information from the terminal, the controller 910 controls the transmitter 915 to forward the access request information to the macro BS. Upon recognition that the receiver 905 has received a command to "stop transmitting preamble" from the macro BS, the controller 910 stops transmitting the preamble and controls the transmitter 915 to transmit an ACK signal to the macro BS in response to the command to "stop transmitting preamble".

In various embodiments of the present disclosure, it is assumed that mini DUs may not directly transmit or receive signals but relay signals received from a terminal or a macro BS to a target entity. In this case, assume that the apparatus 900 acts as a macro BS. Thereafter, the apparatus 900 even in a power-off mode transmits a preamble and information regarding UL access resources through the transmitter 920. In a case the apparatus 900 acts as a mini DU, the receiver 905 forwards the terminal the preamble and information regarding the UL access resources received from the macro BS.

As described above, power consumption of a macro BS may be reduced by installing mini DUs within a service coverage area of the macro BS, which operate while the macro BS is powered off, and having the mini DUs take the place of the macro BS when there is no terminal operating in an active mode within the service coverage area.

For example, various embodiments of the present disclosure have an advantage of preventing unnecessary power consumption of a macro BS in a radio communication system while providing seamless services for a terminal by installing mini BSs within the service coverage area of the macro BS and controlling at least one mini BS to transmit a preamble in the place of the macro BS if there is no terminal operating in an active mode within the service coverage area.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for reducing power consumption of a macro Base Station (BS) by the macro BS in a radio communication system, the method comprising:
   determining whether there is at least one active terminal within a service coverage area of the macro BS;
   transmitting a power-on command to at least one data processing unit installed within the service coverage area of the macro BS if the at least one active terminal is not present within the service coverage area of the macro BS; and
   switching to a power-off state if a response of the command is received from the at least one data processing unit.

2. The method of claim 1, further comprising:
   remaining a power-on state if the at least one active terminal is net-present within the service coverage area of the macro BS.

3. The method of claim 1, further comprising:
   switching, if an access request is received from a terminal receiving a preamble transmitted from the at least one data processing unit, to a power-on state; and
   transmitting a command to stop the transmitting of the preamble to the at least one data processing unit.

4. A method for reducing power consumption of a macro Base Station (BS) by a data processing unit in a radio communication system, the method comprising:
   receiving a power-on command from the macro BS if at least one active terminal is not present within a service coverage area of the macro BS, and transmitting a response of the power-on command to the macro BS;
   after transmitting a preamble, if access request information received from a terminal that received the preamble is received after transmitting a preamble, forwarding the access request information to the macro BS switched to a power-off state; and
   stopping the transmitting of the preamble upon reception of a command to stop the transmitting of the preamble from the macro BS switched to a power-on state.

5. The method of claim 4, wherein the transmitting of the preamble comprises:
   forwarding at least one of a preamble received from the macro BS, information regarding uplink access resources, and indication information indicating an entity that transmits the preamble.

6. The method of claim 4, wherein the stopping of the transmitting of the preamble comprises:
   transmitting a response signal to the macro BS in response to the command to stop the transmitting of the preamble, and entering a standby mode that operates at a minimum power to receive a power-on command from the macro BS.

7. A method for reducing power consumption of a macro Base Station (BS) by a terminal in a radio communication system, the method comprising:
   receiving a preamble that includes indication information and determining an entity that transmits the preamble based on the indication information; and
   transmitting access request information to the macro BS, if the entity is the macro BS, and performing an access procedure with the macro BS upon expiration of an access waiting time.

8. The method of claim 7,
   wherein the access waiting time comprises a time it takes a data processing unit installed within a service coverage area of the macro BS that transmits the preamble to forward the macro BS notification that the access request information destined for the macro BS has been received from the terminal, and a time it takes the macro BS to be switched from a power-off state to a power-on state upon reception of the notification, and
   wherein the access waiting time is set to be less than a time it takes the terminal to transmit the access request information to the macro BS and wait for an access response from the macro BS.

9. The method of claim 7, wherein the receiving of the preamble comprises at least one of:
   receiving a preamble transmitted from the macro BS, and receiving a preamble originated from the macro BS in a power-off mode through a data processing unit installed within a service coverage area of the macro BS.

10. A macro Base Station (BS) for reducing power consumption in a radio communication system, the macro BS comprising:
    a controller configured to:
      determine whether there is at least one active terminal within a service coverage area of the macro BS,
      control a transceiver to transmit a power-on command to at least one data processing unit installed within the service coverage area if the at least one active terminal is not present within the service coverage area of the macro BS, and
      switch to a power-off state if a response of the command is received from the at least one data processing unit; and
    a transceiver configured to transmit the power-on command by control of the controller.

11. The macro BS of claim 10, wherein, if the at least one active terminal is present within the service coverage area of the macro BS, the controller is further configured to remain a power-on state.

12. The macro BS of claim 10, wherein, if an access request is received from a terminal receiving a preamble transmitted from the at least one data processing unit, the controller is further configured to:
    switch to a power-on sate, and
    control the transceiver transmitting a command to stop the transmitting of the preamble to the at least one data processing unit.

13. A data processing unit for reducing power consumption of a macro Base Station (BS) in a radio communication system, the data processing unit comprising:

a transceiver configured to:
  receive a power-on command from the macro BS if at least one active terminal is not present within a service coverage area of the macro BS, and
  transmit a response of the power-on command to the macro BS; and
a controller configured to control the transceiver to:
  transmit a preamble,
  forward access request information, received from a terminal that received the preamble, to the macro BS switched to a power-off state, and
  stop transmitting the preamble upon recognition that a command to stop the transmitting of the preamble has been received from the macro BS switched to a power-on state.

14. The data processing unit of claim 13, wherein the transceiver is further configured to forward at least one of a preamble received from the macro BS, information regarding uplink access resources, and indication information indicating an entity that transmits the preamble.

15. The data processing unit of claim 13, wherein the controller is further configured to control the transceiver to:
  transmit a response signal to the macro BS in response to the command to stop the transmitting of the preamble, and
  enter a standby mode that operates at minimum power to receive a power-on command from the macro BS.

16. A terminal for reducing power consumption of a macro Base Station (BS) by a terminal in a radio communication system, the terminal comprising:
  a transceiver configured to receive a preamble that includes indication information; and
  a controller configured to:
    determine an entity that transmits the preamble based on the indication information,
    control the transceiver to transmit access request information to the macro BS, if the entity is the macro BS, and
    perform an access procedure with the macro BS upon expiration of an access waiting time.

17. The terminal of claim 16,
wherein the access waiting time comprises a time it takes a data processing unit installed within a service coverage area of the macro BS that transmits the preamble to forward the macro BS notification that the access request information destined for the macro BS has been received from the terminal, and a time it takes the macro BS to be switched from a power-off state to a power-on state upon reception of the notification, and
wherein the access waiting time is set to be less than a time it takes the terminal to transmit the access request information to the macro BS and wait for an access response from the macro BS.

18. The terminal of claim 16, wherein the preamble is received from the macro BS, received through a data processing unit installed within a service coverage area of the macro BS from the macro BS.

* * * * *